United States Patent [19]

Reed, Jr. et al.

[11] 4,379,903

[45] Apr. 12, 1983

[54] PROPELLANT BINDERS CURE CATALYST

[75] Inventors: Russell Reed, Jr.; May L. Chan, both of Ridgecrest, Calif.

[73] Assignee: The United States of America as represented by the Secretary of the Navy, Washington, D.C.

[21] Appl. No.: 353,773

[22] Filed: Mar. 1, 1982

[51] Int. Cl.$^3$ .......................................... C08G 18/38
[52] U.S. Cl. ....................................... 528/55; 528/58; 528/77; 528/78
[58] Field of Search ....................... 528/55, 58, 77, 78

[56] References Cited

U.S. PATENT DOCUMENTS

| | | | |
|---|---|---|---|
| 3,385,807 | 5/1968 | Herdlein et al. | 260/2.5 |
| 3,476,933 | 11/1969 | Mendelsohn | 260/2.5 |
| 3,929,709 | 12/1975 | Olstowski et al. | 528/58 X |
| 4,002,584 | 11/1977 | Takahashi et al. | 528/55 X |
| 4,150,212 | 4/1979 | Meyborg | 528/55 |
| 4,184,031 | 1/1980 | Graham et al. | 528/55 |
| 4,268,450 | 5/1981 | Frankel et al. | 260/349 |
| 4,288,262 | 9/1981 | Flanagan et al. | 149/19.1 |

*Primary Examiner*—Maurice J. Welsh
*Attorney, Agent, or Firm*—R. F. Beers; W. Thom Skeer; Roger F. Phillips

[57] ABSTRACT

A multiple component catalyst system for curing of energetic urethane binders for solid fuel propellants and gas generators based upon curing of glycidyl-azide polymer and isocynate curative mixtures. Void or bubble free propellant grains are obtained by employing a cure catalyst composed of a mixture of triphenyl bismuth and dibutyltin dilaurate, preferably in a respective ratio of about 10:1 by weight. The void free propellant grains have burn characteristics acceptable for missile propulsion applications.

14 Claims, No Drawings

PROPELLANT BINDERS CURE CATALYST

BACKGROUND OF THE INVENTION

1. Field of the Invention

This invention is related to the field of chemistry. More particularly this invention is related to solid fuel propellants and gas generators, more particularly to urethane binders based upon curing of Glycidyl-Azide Polymer (GAP)/isocyanate mixtures, processes for their cure, and catalysts suitable for use therein. This invention is also related to polyurethane casting resins in general, catalysts for their cure, processes for their use, and cured articles formed thereby.

2. Description of the Prior Art

Composite solid propellants normally comprise a rubbery phase which is intimately admixed with and serves as a binder for such additional solid ingredients as ammonium perchlorate or other oxidizers, finely divided aluminum, or other metallic fuel, and to a minor extent such other additives as, for example, iron oxide. The polyurethane binder system is known to impart superior physical and mechanical properties to the propellant. U.S. Pat. No. 4,184,031 to Graham et al., the disclosure of which is incorporated by reference, is illustrative.

Gun propellant binders of nitrocellulose plasticized with GAP are known in the prior art such as the copolymerization with nitrocellulose illustrated in U.S. Pat. No. 4,288,262 to Flanagan et al., the disclosure of which is incorporated by reference. Heretofore, reaction mixtures of glycerol initiated GAP and isocyanates using known effective catalysts in the presence of some commonly used propellant ingredients had a tendency to gas such that the cured propellants produced were not useable. Even a relatively small percentage of gas bubbles, which produce voids in the cured solid propellant grain, can result in uncontrolled and unpredictable burn rates which can result in explosion of the rocket motor or gas generator. The presence of these voids also undesirably reduces the density and thus the available energy from a given sized propellant grain.

Various catalysts known to promote urethane linkage have been tried but found unsatisfactory. Most catalysts, triphenyl bismuth (TPB) as well as several tin containing catalysts caused unacceptable gassing. The iron acetylacetonate was found effective, however, it caused thermal degradation of the azide polymers and was thus unusable. The TPB catalyst was further noted as having low activity in curing GAP/isocynate mixtures.

Due to the energetic properties of GAP, its use in a propellant as a binder would be highly desired over non-energetic prior art binders since a higher specific impulse performance is attained. This is particularly desirable in volume limited missile applications where range of existing missiles could be extended.

SUMMARY OF THE INVENTION

According to this invention curing of GAP/isocyanate mixtures as binders is accomplished without gassing by employing a catalyst comprising a mixture of TPB and small amounts of dibutyltin dilaurate (T-12) within the cure system.

A further surprising advantage of the invention is that rates of cure and pot life of the GAP/isocyanate mixtures have been easily varied and controlled by adjusting the level of T-12 while keeping the level of TPB constant. This allows thorough mixing and handling of reactants followed by a fast cure, thus, allowing economical use of production facilities. The ability to tailor process parameters while employing the same overall catalytic level is a substantial advantage of the inventive two component catalyst over a single component catalyst.

DESCRIPTION OF THE PREFERRED EMBODIMENT

Urethane binders from GAP/isocyanate mixtures have been developed to exploit their energetic, i.e., explosive properties. A GAP energetic binder is described in U.S. Pat. No. 4,268,450 to Frankel et al., the disclosure of which is incorporated by reference.

Glycerol initiated GAP prepolymer is prepared by the polymerization of epichlorohydrin in the presence of glycerol catalyzed by a boron trifluoride complex to form a polyepichlorohydrin product trifunctional in hydroxyl groups which product is treated with sodium azide in a suitable solvent such as dimethylformamide resulting in the replacement of the chloro groups by azido groups to yield GAP. Glycerol initiated GAP is represented by the following structural formula:

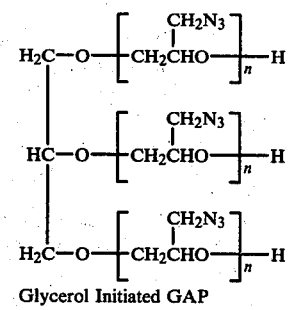

Glycerol Initiated GAP where n is an integer from 8 through 10.

Reaction of the above with isocyanate is effected according to the following scheme.

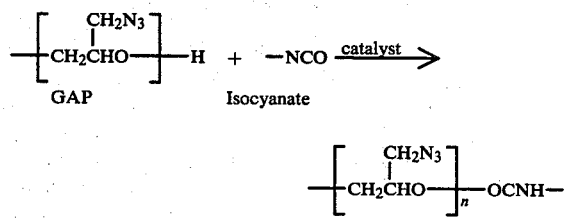

Copolymerization to form a binder is effected by reacting a GAP with a polyfunctional isocyanante such as a diisocyanate R'(NCO)$_2$ where R' is any alkyl group.

An alternative binder can be formed with ethylene glycol initiated GAP, a difunctional GAP, according to the reaction scheme presented above for glycerol initiated GAP.

The formation of voids in the previous product propellants due to gassing during the reaction made these propellants unusable. The gassing has been found to be attributable to a side reaction between isocyanate and water leading to evolution of carbon dioxide.

In the reaction of an isocyanate with water an unstable alkyl carbamic acid is formed which decomposes in the presence of catalyst to liberate carbon dioxide, the primary source of gas. Also, the alkyl amine produced thereby tends to react with more isocyanate raw material to produce a dialkyl urea. The final result of the reaction of an isocyanate with water is the formation of carbon dioxide and a polyurea.

It is clear from the above that either water must be eliminated from the reaction system, a practical impossibility, or a catalyst must be found which would strongly promote the urethane linkage reaction compared to the isocyanate-water reaction in order to produce a desirable cured product.

It was found that GAP/isocyanate mixtures could be cured for use as binders without gassing by employing a mixture of TPB and small amounts of T-12 within the cure system as a catalyst.

As mentioned above in the Background, the TPB catalyst employed alone was very low in catalytic activity. The T-12 catalyst when employed alone results in erratic cures sometimes producing grains with tacky surfaces. When employed together the T-12 is thought to activate the TPB for catalytic purposes. The T-12 concentration appears to provide the major driving force of the curing reaction while the TPB level tends to moderate the reaction and to produce consistent curing rates. The mixed catalyst also improves the final mechanical properties of the cured composite propellants.

Pot life, i.e., the handling time available between mixing and when the cure begins to set up, and cure time of the GAP/isocyanate binder system is dependent on the specific materials used, the mixing and curing temperature, the size of the cured grain, and the catalyst concentration. An advantage of the present invention is that cure time may be adjusted by varying the ratio of T-12 to TPB in the catalyst while adding the same amount of total catalyst in the cure system.

The ratio of TPB to T-12 can be varied to tailor pot life, curing rate, and cure quality and can range from 14:1 to 2.5:1 by weight with a preferred ratio of about 10:1. As mentioned above, the concentration of T-12 in the cure mix appears to be the main driving force in the cure rate. The ratio of T-12 to GAP can vary from about 0.0001 to 0.0003 by weight with GAP of a molecular weight of about 2500 and an equivalent weight of about 950. The higher ratios are preferred in the presence of plasticizers. The ratio of isocyanate to GAP added to the cure system is preferred to be about stoichometric, i.e., molar ratio of NCO to OH functional groups is about 1.0.

Mixing of the GAP/isocyanate system is normally carried out at room temperature or such higher temperature as to provide a viscosity sufficiently low to allow thorough mixing. Curing temperature of the system can vary depending on factors such as desired cure time, but typically is held within the range of ambient room temperature to 140° F. with a preferred range of 110° to 130° F. Curing time is dependent upon many factors as discussed above, but is typically carried out within the range of 1 to 5 days, preferably 1 to 3 days, a short cure time being desired for reasons of economy. A pot life of 3-7 hours is typically desired to allow casting of the propellant into rocket motor motor cases. The invention is more fully described by the examples presented below. In these examples the GAP is glycerol initiated with a molecular weight of about 2500 and an equivalent weight of 946. Isocyanate liquid curatives employed are lysine diisocyanate methyl ester (LDIM), hexamethylene diisocyanate (HMDI), and bis (4-isocyanato cyclohexyl) methane (HYLENE W) and the biuret trimer of hexamethylene diisocyanate (N-100). Liquid plasticizers employed are bis (fluorodinitroethyl) formal (FEFO), trimethylolethane trinitrate (TMETN) and an eutectic mixture of about equal weights of bis (2,2-dinitropropyl) formal and acetal (BDNPF/A). The TPB is in crystalline form. The T-12 is a liquid with small amounts of lauric acid present, either added as a solvent or present as a result of hydrolysis of the dibutyltin dilaurate. Solids added include cyclotetramethylenetetranitramine (HMX) crystals of about 10 microns and aluminum powder of about 80-100 microns. The ratio of isocyanate to hydroxyl equivalents is designated by NCO/OH.

Table 1 includes data on cures made without solids other than the TPB.

TABLE I

| Test    | 1     | 2     | 3     | 4     | 5     |
|---------|-------|-------|-------|-------|-------|
| GAP     | 12.0  | 12.0  | 12.0  | 10.2  | 10.2  |
| LDIM    | 1.33  | 1.1   | 1.01  | 0.0   | 0.0   |
| N-100   | —     | 0.26  | 0.49  | 1.2   | 1.8   |
| TPB     | 0.015 | 0.015 | 0.015 | 0.014 | 0.014 |
| T-12    | 0.002 | 0.002 | 0.002 | 0.002 | 0.002 |
| NCO/OH  | 1.1   | 1.0   | 1.0   | 0.6   | 0.9   |

The tests in Table I were carried out by mixing all ingredients except T-12 and degassing the mix in a vacuum oven at 120° F. for 40 minutes. After all the TPB was dissolved, the T-12 was added and well mixed. The mixture was poured into ⅜ inch by 6 inch polyethylene tube and cured overnight at 120° F. Curing took place substantially without void formation.

Table II includes data on cures made with plasticizers without solids other than TPB.

TABLE II

| Test    | 6     | 7     | 8     |
|---------|-------|-------|-------|
| GAP     | 6.0   | 6.0   | 6.0   |
| HMDI    | 0.48  | 0.48  | 0.48  |
| N-100   | 0.56  | 0.56  | 0.56  |
| FEFO    | 12.0  | —     | —     |
| BDNPF/A | —     | 12.0  | —     |
| TMETN   | —     | —     | 12.0  |
| T-12    | 0.004 | 0.004 | 0.004 |
| TPB     | 0.010 | 0.010 | 0.010 |
| NCO/OH  | 1.0   | 1.0   | 1.0   |

The test in Table II were carried out according to the procedures of Table I except that curing was carried out at 120° F. for two days. Curing took place substantially without void formation.

TEST 9

A cure was carried out which included explosives solids as follows. The composition was made up of the following materials by weight percent: GAP, 9.72; HYLENE W, 0.61; N-100, 0.87; FEFO, 19.43; Al, 13.04; HMX, 56.25; T-12, 0.02; TPB, 0.035. The test was carried out according to the procedures of Table I with a resulting cured grain having acceptable physical properties and substantially no voids.

TEST 10

A cure was carried out employing T-12 alone as the catalyst. The cure composition was made up of the following materials: GAP, 12 g.; LDIM, 1.33 g.; T-12; 0.003 g. The result was a relatively fast, but incomplete cure with the grain having a tacky surface and relatively low tensile strength. A mixture having the same composition but with addition of 0.015 g. TPB resulted in a complete overnight cure with a grain having superior physical properties. The tests were carried out according to the procedures of Table I.

TEST 11

A cure was carried out employing an ethylene glycol initiated GAP with an average molecular weight of about 2139 and an equivalent weight of about 1122 and a functionality of about 2. The cure composition was made up of the following materials by weight percent: GAP, 9.72; Hylene W, 0.61; N-100, 0.87; FEFO, 19.44; Al (82–100 microns), 13.05; HMX, 56.27; T-12, 0.004; TPB, 0.04. The test was carried out according to the procedure of Table I with the result that a cured grain having acceptable physical properties and substantially no voids was produced.

Other catalysts such as metallic acetylacetonate and titanium alkoxides were individually investigated in GAP/isocyanate cure systems but were found to be less effective and/or gas producing. Mixtures of TPB and T-12 were found to be particularly effective in consistently producing well cured non-tacky void free polymers.

In summary, a void free propellant grain and methods for making said grain have been developed employing an energetic binder, GAP, and an isocyanate which employs a non-gassing curing catalyst of a mixture of TPB and T-12. The absence of bubble formation during cure results in a void free grain having acceptable burning characteristics for solid rocket applications.

Obviously many modifications and variations of the present invention are possible in light of the above teachings. It is therefore to be understood that within the scope of the appended claims the invention may be practiced other than specifically described.

What is claimed is:

1. A process for the curing of a glycidyl-azide polymer (GAP)/isocyanate binder system which comprises:
   (a) adding a non-gassing catalyst to a mixture comprising glycidyl-azide polymer and isocyanate curative to form said binder system; and
   (b) curing said binder system to form a substantially void free grain.

2. A process according to claim 1 wherein said catalyst comprises a mixture of triphenyl bismuth (TPB) and dibutyltin dilaurate (T-12).

3. A process according to claim 2 wherein the proportion of TPB to T-12 in said catalyst mixture is within the range of from about 2.5 to 1 to about 14 to 1.

4. A process according to claim 1 wherein said binder system is cured at temperatures within the range of ambient room temperature to about 140° F.

5. A process according to claim 1 wherein said binder system is cured at temperatures within the range of about 100° F. to about 130° F.

6. A process according to claim 1 wherein said binder system is cured for a time period within the range of about 24 hours to about 72 hours.

7. A process according to claim 1 wherein sufficient catalyst is employed such that a pot life of the uncured binder is within the range of 3 hours to seven hours.

8. A process according to claim 2 wherein the weight ratio of T-12 to GAP is within the range of 0.0001 to 1 to about 0.0003 to 1.

9. A process according to claim 8 wherein the equivalent weight of said GAP is about 950 grams.

10. A process according to claim 1 wherein about a stoichiometric ratio of amounts of GAP to isocyanate is employed.

11. A process according to claim 1 wherein said GAP is selected from the group consisting of glycerol initiated GAP and ethylene glycol initiated GAP.

12. A process according to claim 1 wherein said isocyanate is selected from the group consisting of lysine diisocyanate methyl ester, hexamethylene diisocyanate, bis (4-isocyanato cyclohexyl) methane, and the biuret trimer of hexamethylene diisocyanate.

13. A process according to claim 1 wherein said binder system mixture further comprises liquid plasticer selected from the group consisting of bis (fluorodinitroethyl)formal, trimethylolethane trinitrate, and a eutectic mixture of about equal weights of bis (2,2-dinitropropyl)formal and acetal.

14. A process according to claim 1 wherein said binder system mixture further comprises cyclotetramethylenetetranitramine crystals of about 10 microns diameter and aluminum power of about 80 to 100 microns diameter.

* * * * *